United States Patent
Jannin et al.

(10) Patent No.: US 9,587,485 B2
(45) Date of Patent: Mar. 7, 2017

(54) METHODS AND APPARATUS TO DETECT FLUID DISTRIBUTIONS

(71) Applicant: Schlumberger Technology Corporation, Sugar land, TX (US)

(72) Inventors: Gaelle Jannin, Houston, TX (US); Emmanuel Legendre, Sevres (FR); Edward Nichols, Berkeley, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 86 days.

(21) Appl. No.: 14/404,473

(22) PCT Filed: May 30, 2013

(86) PCT No.: PCT/EP2013/061207
§ 371 (c)(1),
(2) Date: Nov. 27, 2014

(87) PCT Pub. No.: WO2013/178765
PCT Pub. Date: Dec. 5, 2013

(65) Prior Publication Data
US 2015/0233234 A1 Aug. 20, 2015

(30) Foreign Application Priority Data
Jun. 1, 2012 (EP) .................................... 12290182

(51) Int. Cl.
*G01V 3/24* (2006.01)
*E21B 47/10* (2012.01)
*G01V 3/34* (2006.01)
*G01V 3/20* (2006.01)
*E21B 49/08* (2006.01)

(52) U.S. Cl.
CPC .......... *E21B 47/102* (2013.01); *E21B 49/087* (2013.01); *G01V 3/20* (2013.01); *G01V 3/34* (2013.01); *E21B 2049/085* (2013.01)

(58) Field of Classification Search
CPC . E21B 47/10; G01V 3/20; G01V 3/34; G01V 3/24
USPC .................................. 324/323–375
See application file for complete search history.

(56) References Cited

U.S. PATENT DOCUMENTS 5,642,051 A  6/1997  Babour et al.
6,128,949 A * 10/2000  Kleinberg .......... G01N 33/2823
                                              166/250.01

(Continued)

OTHER PUBLICATIONS

S. Naryan, M.B. Dusseault, "Sensitivity Studies of Resistivity Monitoring for Shallow Enhanced Recovery Processes—A Numerical Case History," Journal of Canadian Petroleum Technology, vol. 39, No. 2, Feb. 1, 2000, pp. 52-61.

(Continued)

*Primary Examiner* — Vinh Nguyen
*Assistant Examiner* — Alvaro Fortich
(74) *Attorney, Agent, or Firm* — Cameron Sneddon

(57) ABSTRACT

A disclosed example method involves receiving a first signal transmitted into a reservoir from a production installation in a formation at a wellsite, and determining an apparent resistance of the reservoir based on the first signal. A distance between a fluid extraction tool and a fluid distribution is determined based on the apparent resistance.

14 Claims, 8 Drawing Sheets

(56) References Cited

U.S. PATENT DOCUMENTS

| | | | | |
|---|---|---|---|---|
| 6,353,322 B1* | 3/2002 | Tabarovsky | ............. | G01V 3/20 |
| | | | | 324/358 |
| 6,594,584 B1* | 7/2003 | Omeragic | ................ | G01V 3/28 |
| | | | | 702/9 |
| 2004/0154831 A1* | 8/2004 | Seydoux | ................... | E21B 7/04 |
| | | | | 175/24 |
| 2004/0245016 A1* | 12/2004 | Chemali | ................. | E21B 44/00 |
| | | | | 175/25 |
| 2007/0040557 A1* | 2/2007 | Johnstad | ............... | E21B 47/042 |
| | | | | 324/324 |
| 2007/0216416 A1* | 9/2007 | Itskovich | ................. | G01V 3/28 |
| | | | | 324/339 |
| 2011/0133740 A1* | 6/2011 | Seydoux | ................. | G01V 3/28 |
| | | | | 324/338 |
| 2011/0139443 A1 | 6/2011 | Chen | | |

OTHER PUBLICATIONS

M.Z. Jaafar, et al, "Measurements of Streaming Potential for Downhole Monitoring in Intelligent Wells," 16th Middle East Oil and Gas Show and Conference 2009, Bahrain, Mar. 15-18, 2009, Curran, Red Hook NY, No. SPE 120460, Mar. 15, 2009, pp. 1-14.

* cited by examiner

METHODS AND APPARATUS TO DETECT FLUID DISTRIBUTIONS

BACKGROUND OF THE DISCLOSURE

Oil prospecting is used to find rock formations that may be hydrocarbon traps. Methods used to determine the nature and structure of subterranean rock formations include satellite photography, seismic surveying, and wireline logging. When a possible hydrocarbon trap is identified, a well is drilled and tested to evaluate reservoir permeability, volume and connectivity. When a hydrocarbon trap is confirmed, a well is produced and extraction begins. However, extraction is subject to any elements, materials, or fluids present in the hydrocarbon trap or that infiltrate the hydrocarbon trap during the extraction process. As such, a well may at times produce water mixed with oil when water permeates the hydrocarbon trap as it is drawn toward the downhole production installation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A disclosed example method involves receiving a first signal transmitted into a reservoir from a production installation in a formation at a wellsite, and determining an apparent resistance of the reservoir based on the first signal. A distance between a fluid extraction tool and a fluid distribution is determined based on the apparent resistance.

A disclosed example apparatus includes a transducer controller and a processor. The transducer controller is to measure a first signal transmitted into a reservoir from a production installation in a formation at a wellsite. The processor is to determine an apparent resistance of the reservoir based on the first signal, and determine a distance between a fluid extraction tool and a fluid distribution based on the apparent resistance.

A disclosed example system includes a production installation to be located in a formation at a wellsite, and a plurality of transducers located in the production installation and to be located along a horizontal portion of the formation to measure signals transmitted into a reservoir. The example system also includes a processor to determine a distance between a fluid extraction tool and a fluid distribution based on the measured signals.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
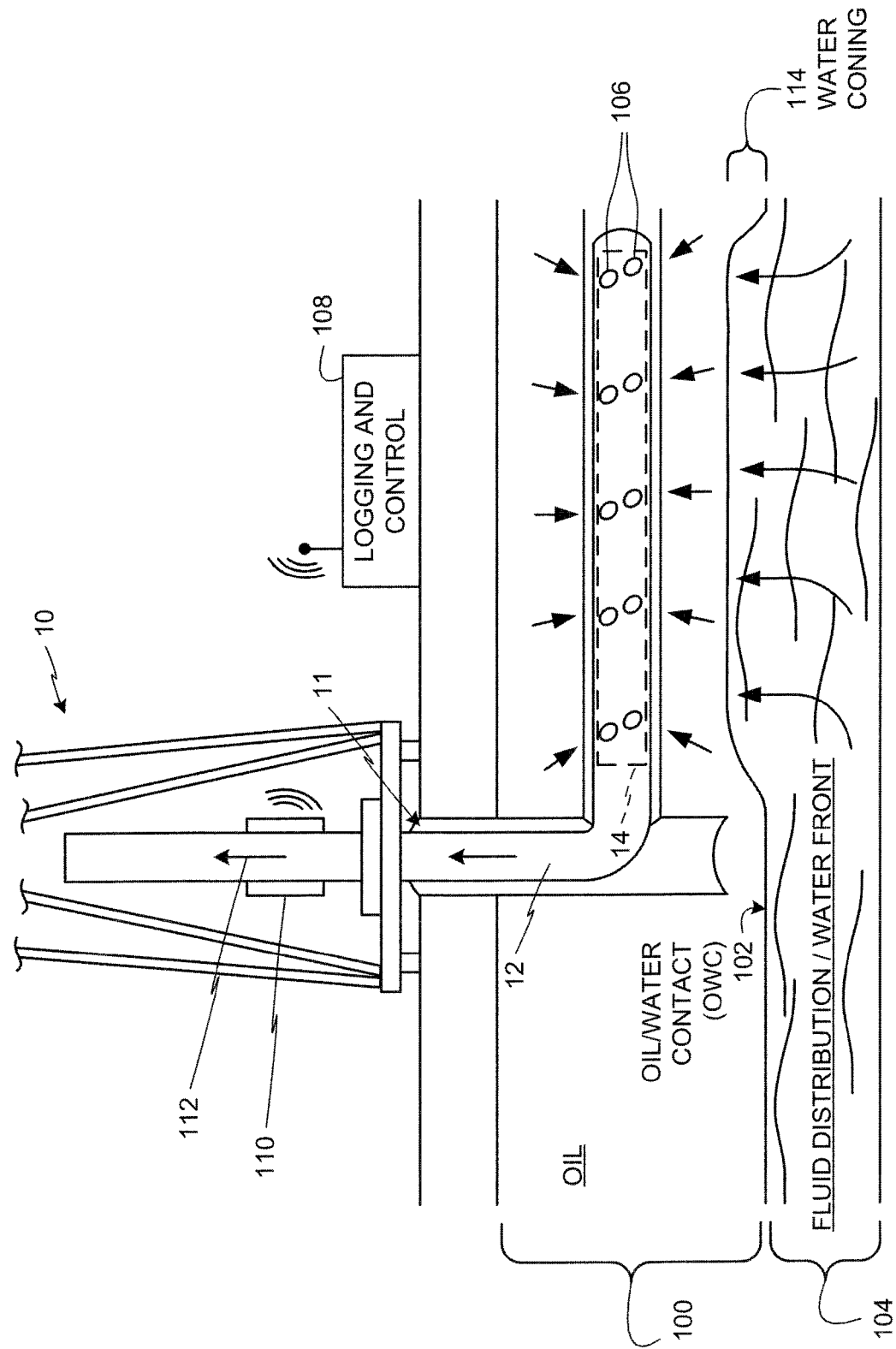
FIG. 1 illustrates an example system to detect water fronts.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

Examples disclosed herein may be used to monitor changes in fluid distributions (e.g., water fronts) during oil and/or gas extraction phases. Examples disclosed herein are useful to improve production quality by measuring water front arrivals near production wells. Early detections of water front movements enable implementing proactive mitigation techniques to prevent or substantially decrease instances of water breakthroughs. This enables implementing, monitoring, and/or adjusting optimization strategies for production rate and recovery.

In prior extraction techniques of production wells in which evolution of oil and water volumes around the well are not monitored, water coning effects often result in unwanted water production. Excessive water production has been a long-standing problem for operators since the beginning of the petroleum industry. Unlike such prior techniques, examples disclosed herein may be used to monitor changes in fluid volumes around production wells. Examples disclosed herein use cylindrical focused interpretation methods in connection with electromagnetic wireless telemetry systems deployed on a downhole production installation to monitor changes in fluid distributions (e.g., water fronts) surrounding production wells and, thus, mitigate water coning effects and prevent or decrease instances of water breakthroughs during extraction. In some disclosed examples, a water front arrival can be detected more than 10,000 inches (≈250 meters) away from the production installation. Such early detection of the water front provides sufficient time to implement a suitable mitigating solution to control water coning from its source and reduce or eliminate it, for example, by adjusting the production rate from that particular zone.

Examples disclosed herein use deep sensing measurements to monitor fluid distributions (e.g., water fronts) while they are still relatively far away from production installation during extraction phases. Examples disclosed herein are useful in horizontal and non-horizontal wells. As described in more detail below, the disclosed examples use a low-frequency wireless telemetry network of transducers (or antennas) deployed downhole on a production installation. These downhole transducers are powered using downhole powering systems provided in the production installation to transmit and receive low-frequency signals based on low-frequency currents and voltages. Examples disclosed herein monitor currents and voltages along the production installation, and measure resistivity changes of a reservoir during production of a well to determine changes in water fronts. In this manner, distances between the production installation and water fronts can be estimated.

Examples disclosed herein use focalization measurement techniques to evaluate distances between fluid distributions (e.g., water fronts) and production installations. Implementing examples disclosed herein using current transducers having a 1 microvolt detection threshold, a 3 microvolt resolution, and 0.1% accuracy enables a depth of investigation larger than 10,000 inches ($\approx$2250 meters) in production systems. In this manner, water front arrivals can be detected at up to 10,000 inches away from production installations (e.g., the production installation 12 of FIG. 1). Other suitable depths of investigation can alternatively or additionally be enabled using different thresholds and resolutions.

FIG. 1 illustrates a wellsite system in which examples disclosure herein can be employed. In the illustrated example, the wellsite system is equipped with advanced completion technology in a reservoir 100 having an oil/water contact (OWC) 102 at which oil (or hydrocarbons) in the reservoir 100 is in contact with a fluid distribution or water front 104. In the illustrated examples, the fluid distribution 104 is shown as a water front. However, the fluid distribution 104 may be any other type of fluid that is not desired to be extracted during oil or hydrocarbon production. The wellsite can be onshore or offshore. In the illustrated example system, a platform and derrick assembly 10 is located at a well 11 that is formed in a subsurface formation by rotary drilling in a manner that is well known. In the illustrated example, the subsurface formation is the rock or sediment in a surrounding area about the well 11. A production installation 12 (e.g., a permanent installation, production tubing, etc.) of the illustrated example is suspended within the well 11 and includes fluid inlets 106 at its lower end. The fluid inlets 106 of the illustrated example are part of a fluid extraction tool 14 of the production installation 12. In the illustrated example, the fluid extraction tool 14 is located at a horizontal portion of the well 11 to extract fluid (e.g., hydrocarbons, gas, oil) from the reservoir 100. The wellsite system includes a logging and control system 108 at the surface that is in communication with a communication system 110 of the production installation 12. The logging and control system 108 of the illustrated example receives from the communication system 110 measurement data collected using transducers and/or electronics (e.g., transducers 202a-d of FIG. 2) on the production installation 12, and exchanges control information with the communication system 110 to control fluid extraction operations.

In the illustrated example, during a production phase, the wellsite system extracts fluid through the production installation 12 in a direction generally indicated by arrow 112. Oil production in the well 11 creates a pressure drawdown that elevates the OWC 102 in the immediate vicinity of the well 11. Water has a tendency to remain below the oil because of the water's higher density, which counterbalances the pressure drawdown caused by the oil production. These counterbalancing forces deform the OWC 102 into a cone shape 114 referred to as water coning.

Water coning is a serious problem in many oil fields. It adds water handling costs and substantially decreases a well's productivity by reducing the overall recovery efficiency of oil reservoirs. Examples disclosed herein may be used to increase a field's oil recovery by decreasing production of water through monitoring of changes in the OWC 102 (e.g., monitoring for instances of water coning and infiltration of water into the oil reservoir 100). Water coning occurs as the water front 104 moves in the direction of least resistance in the reservoir 100 while at the same time being balanced by gravity to keep equilibrium at the OWC 102 between the oil in the reservoir 100 and the water front 104.

The production rate of a well (e.g., the well 11 of FIG. 1) is directly proportional to both pressure drawdown and reservoir permeability. In some examples, to achieve a given production rate in low-permeability reservoirs, larger pressure drawdowns are used than are needed to achieve the same production rate at higher permeability reservoirs. In some examples, as pressure drawdown increases, the likelihood of water coning (e.g., the water coning 114 of FIG. 1) increases.

Figure 2:
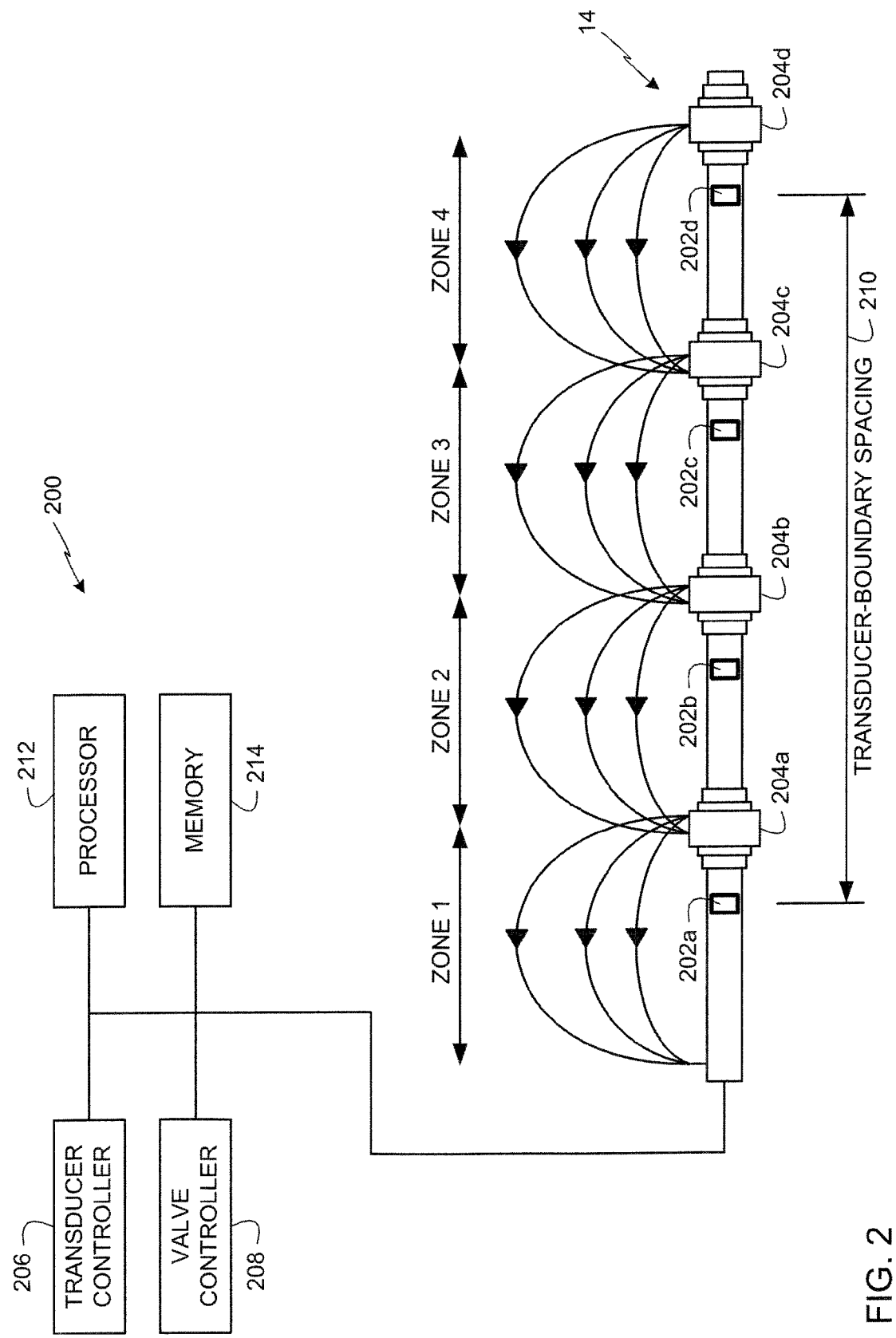
FIG. 2 illustrates an example apparatus in communication with transducers arranged in a downhole production installation to monitor water fronts.

FIG. 2 illustrates an example apparatus 200 in communication with electromagnetic transducers 202a-d arranged in the fluid extraction tool 14 of the production installation 12 of FIG. 1 to monitor water fronts (e.g., the water front 104 of FIG. 1). In the illustrated example, the apparatus 200 is implemented in the logging and control system 108 of FIG. 1. However, the apparatus 200 may be implemented in the production installation 12, or some portions of the apparatus 200 may be implemented in the production installation 12 and other portions in the logging and control system 108. In the illustrated example, zone 1, zone 2, zone 3, and zone 4 are shown along the production installation 12. At each zone 1-4, the production installation 12 of the illustrated example is provided with a respective one of the transducers 202a-d. The transducers 202a-d are spaced apart from one another along the length of the production installation 12, creating a distance between the outer transducers 202a and 202d referred to herein as a transducer-boundary spacing 210. The transducer-boundary spacing 210 can be changed by changing the spacing distances between the transducers 202a-d on the production installation 12 to adjust the focus of a cylindrical focused technique (CFT) and, thus, provide different depths of investigation. For example, increasing the spacings between the transducers 202a-d increases the depth of investigation. The depth of investigation corresponds to how far away from the production installation 12 the water front 104 is detectable. Although four transducers 202a-d are shown in FIG. 2, more transducers may be used in other implementations.

Figure 8:
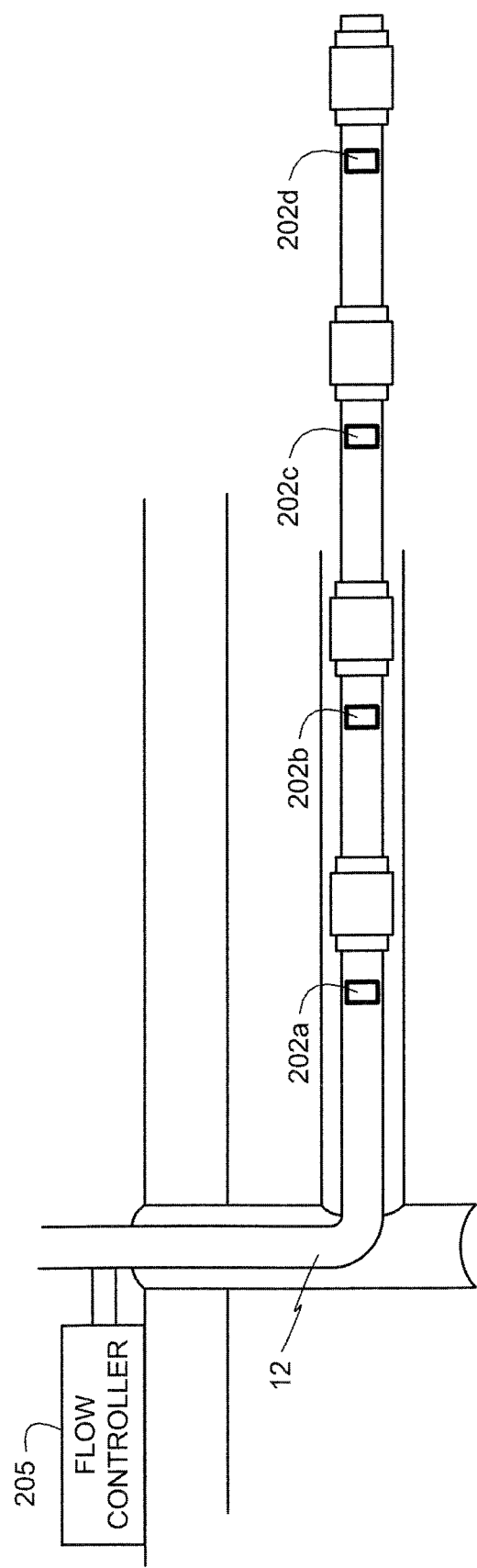
FIG. 8 illustrates the downhole production installation of FIGS. 1 and 2 coupled to a flow controller at a surface.

In the illustrated example, the production installation 12 is also provided with a respective flow control valve 204a-d at each of the zones 1-4. The flow control valves 204a-d of the illustrated example control the amount of fluid that is extracted via the fluid inlets 106 (FIG. 1) of the production installation 12. The apparatus 200 can independently control (e.g., completely or partially close or open) each of the example flow control valves 204a-d to start and stop production at one or more of the zones 1-4 based on whether it has detected water coning in the reservoir (e.g., the water coning 114 in the reservoir 100 of FIG. 1). In the illustrated example, providing the multiple flow control valves 204a-d divides the horizontal portion of the well 11 into the smaller zones 1-4. In some examples, the multiple smaller zones 1-4 enable better control of the reservoir 100 to increase oil recovery. In some examples, a flow controller 205 located at the surface as shown in FIG. 8 is used in addition to or instead of the flow control valves 204a-d to control the amount of fluid that is extracted via the fluid inlets 106 (FIG. 1) of the production installation 12. In the illustrated example, the flow controller 205 is implemented using or both of a valve and/or a pump. In this manner, based on measurements using the transducers 202a-d, the flow controller 205 can increase production by increasing a valve opening at the surface and/or increasing a pump speed at the surface, or the flow controller 205 can decrease production by decreasing a valve opening at the surface and/or decreasing a pump speed at the surface.

To control and communicate with the transducers 202a-d, the apparatus 200 of the illustrated example is provided with an example transducer controller 206. The transducer controller 206 controls the voltages applied across the transducers 202a-d to emit current signals into the reservoir 100, controls the transmission frequencies of the transducers 202a-d, and controls when the transducers 202a-d function as receivers to detect current and voltage signals resulting from the emitted current signals as they loop back in the reservoir 100 to the production installation 12.

To control the flow control valves 204a-d, the apparatus 200 of the illustrated example is provided with an example valve controller 208. The valve controller 208 controls the partial and complete opening and closing of the flow control valves 204a-d to extract more or less fluid from the reservoir 100 via the fluid inlets 106 (FIG. 1) or to cease extraction of fluid at one or more of the fluid inlets 106. In the illustrated example, the valve controller 208 can selectively control each of the flow control valves 204a-d independent of one another to create different production rates (or fluid extraction rates) across the different zones 1-4.

In the illustrated example of FIG. 2, the transducers 202a-d are implemented using electromagnetic antennas that transmit and receive current signals in the reservoir 100 (FIG. 1). That is, each transducer 202a-d can operate as a source to generate and transmit low-frequency current signals in the metallic completion well 11 of the reservoir 100 that loop back to the production installation 12, and each transducer 202a-d can also operate as a receiver to detect the looped back (or returning) current signals flowing in the metallic completion well 11. In other examples, some of the transducers 202a-d operate as transmitters and others of the transducers 202a-d operate as receivers. In yet other examples, the transducers 202a-d operate as transmitters, and other transducers (not shown) of the production installation 12 operate as receivers. In some examples, the transducers 202a-d can be used to provide redundancy by having two or more sets of transducers performing the same measurements. Such redundancy can be used to confirm that the transducers are functioning properly (e.g., by comparing measured results from different transducer sets to one another) and/or used in combination to increase measurement accuracies or depth of investigation. Each of the transducers 202a-d of the illustrated example may be implemented using an electrically insulated gap or a toroidal antenna. In some examples, the transducers 202a-d are gap electrodes located in screen sections of the production installation 12. In the illustrated example, the currents transmitted in the metallic completion well 11 leak off into the formation or reservoir 100 and are sensed by the transducers 202a-d when they loop back to the production installation 12. In the illustrated example, each of the transducers 202a-d transmits current signals at 1 Ampere, and different operating frequencies may be used such as 0.1 Hz, 1 Hz, 10 Hz and 100 Hz.

In the illustrated example, the apparatus 200 uses a cylindrical focused technique (CFT) to monitor changes in the water front 104 (FIG. 1). Using the CFT substantially reduces or eliminates the effect of local changes near the horizontal portion of the well 11, enables focusing measurements provided by the transducers 202a-d at different distances from the production installation 12, and provides a deeper reading in the reservoir 100. The CFT enables controlling the probing current transmitted into the reservoir 100 by the transducers 202a-d, thus, reducing the impact of formation heterogeneities around the system. In the illustrated example, the transducers 202b and 202c transmit probing currents that flow in zones 2 and 3, and bucking currents are transmitted by the transducers 202a and 202b in zones 1 and 2 (or between the transducers 202a and 202b) and the transducers 202c and 202d in zones 3 and 4 (or between transducers 202c and 202d) to facilitate radial flow of the probing current from the transducers 202b and 202c.

In the illustrated example, the apparatus 200 determines the apparent conductivity M (in Siemens) delivered by the CFT using Equation 1 below.

$$M = \frac{(IL_1 * I_{axial4}) + (IL_4 * I_{axial1})}{M_{14} * V_4} \qquad \text{Equation 1}$$

In Equation 1, $IL_1$ is the difference between a measured current ($I_{2a}$) across the transducer 202b and a measured current ($I_{3a}$) across the transducer 202c (i.e., $IL_1=I_{2a}-I_{3a}$), when the transducer 202a transmits a current signal; $IL_4$ is the difference between a measured current ($I_{3d}$) across the transducer 202c and a measured current ($I_{2d}$) 202b (i.e., $IL_4=I_{3d}-I_{2d}$), when the transducer 202d transmits a current signal; $I_{axial1}$ is the mean of the measured currents ($I_{2a}$, $I_{3a}$) across the (transducers 202b and 202c (i.e., $I_{axial1}=\frac{1}{2}(I_{2a}+I_{3a})$, when the transducer 202a transmits; $I_{axial4}$ is the mean of the measured currents ($I_{3d}$, $I_{2d}$) across the transducers 202c and 202b (i.e., $I_{axial4}=\frac{1}{2}(I_{3d}+I_{2d})$, when the transducer 202d transmits; $M_{14}$ is the measured current across the transducer 202a, when the transducer 202d transmits; and $V_4$ is the voltage across the transducer 202d, when the transducer 202d transmits.

To determine apparent conductivity M using Equation 1 above, the apparatus 200 of the illustrated example is provided with a processor 212. The processor 212 may be selected from any family of processors. The processor 212 of the illustrated example also controls other aspects of the apparatus 200 to, for example, control operations of the transducers 202a-d and the flow control valves 204a-d. For example, the processor 212 may determine when and how to transmit or receive currents via the transducers 202a-d and when to completely or partially close or open the flow control valves 204a-d.

In some examples, the processor 212, the transducer controller 206, and the transducers 202a-d can be used as a telemetry system or a redundant telemetry system for sending information from the production installation 12 to receivers located at one or more of a surface of the wellsite of FIG. 1 and/or at a subsea surface such as the sea bottom. In such examples, the processor 212 and/or the transducer controller 206 locate(s) information (e.g., measurements, valve status, fluid extraction status, or other information) in signals transmitted by the transducers 202a-d so that the signals carry the information for reception by a receiver (e.g., at the logging and control system 108 of FIG. 1) at a surface of the wellsite and/or at a subsea surface. In some examples, the transmitted signals are dual-purpose signals that contain information for reception at the surface and are also simultaneously used to measure water front distance. In other examples, the transducers 202a-d transmit information signals for telemetry separate from signals for measuring water front distances. In some examples, the transducers 202a-d also receive signals carrying information from transmitters (or transceivers) located at a surface of the wellsite and/or at a subsea surface so that the transducers 202a-d may be used for bi-directional communications with transceivers at wellsite surfaces and/or subsea surfaces. In such examples, the transducer controller 206 receives the signals from the transducers 202a-d and stores the information from the received signals in memory (e.g., the memory 214) and/or sends the received information to the processor 212 for analysis, processing, storing, etc.

To store measured current/voltage values, calculated values, and other information related to using Equation 1 above or any other computations disclosed herein, the apparatus 200 of the illustrated example is provided with a memory 214. The memory 214 may also store other information including control information for controlling the transducers 202a-d and the flow control valves 204a-d. In addition, the memory 214 of the illustrated example may also store machine readable instructions that, when executed by the processor 212, cause the processor 212 and/or, more generally, the apparatus 200 to implement the processes of FIGS. 3 and 4.

While an example manner of implementing the apparatus 200, the transducers 202a-d, and the flow control valves 204a-d has been illustrated in FIG. 2, one or more of the elements, processes and/or devices illustrated in FIG. 2 may be combined, divided, re-arranged, omitted, eliminated and/or implemented in any other way. Further, the transducer controller 206 and/or the valve controller 208 may be implemented using hardware, software, firmware and/or any combination of hardware, software and/or firmware. Thus, for example, either of the transducer controller 206 or the valve controller 208 could be implemented using one or more circuit(s), programmable processor(s), application specific integrated circuit(s) (ASIC(s)), programmable logic device(s) (PLD(s)) and/or field programmable logic device(s) (FPLD(s)), etc. Further still, the apparatus 200 of FIG. 2 may include one or more elements, processes and/or devices in addition to, or instead of, those illustrated in FIG. 2, and/or may include more than one of any or all of the illustrated elements, processes and devices.

Figure 3:
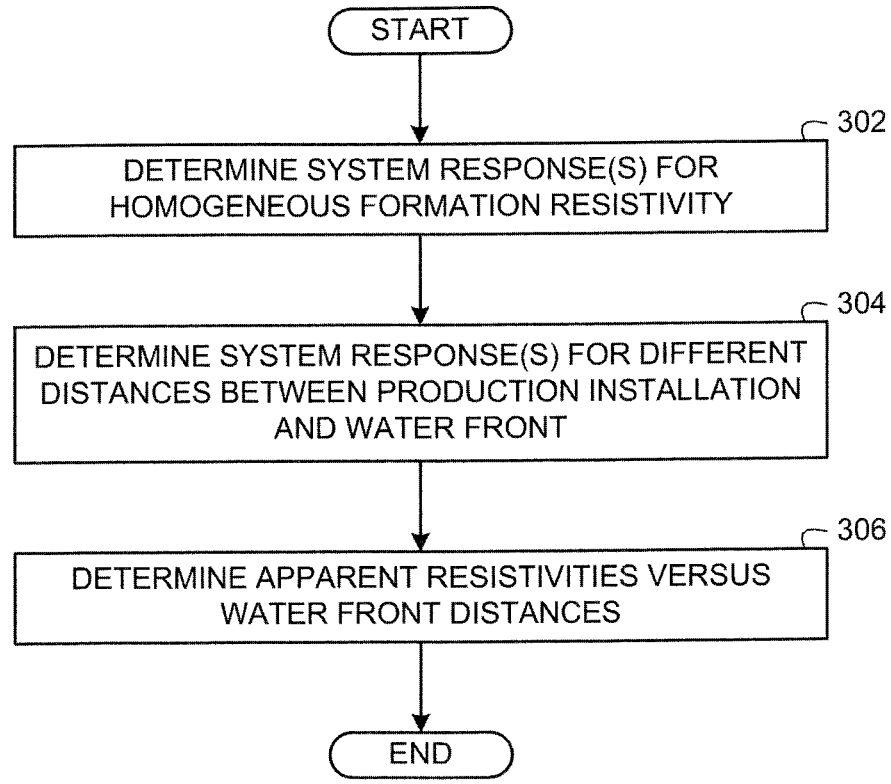
FIG. 3 illustrates an example flow diagram representative of a process that may be used to implement a calibration process to determine apparent conductivity as a function of water front distance.
Figure 4:
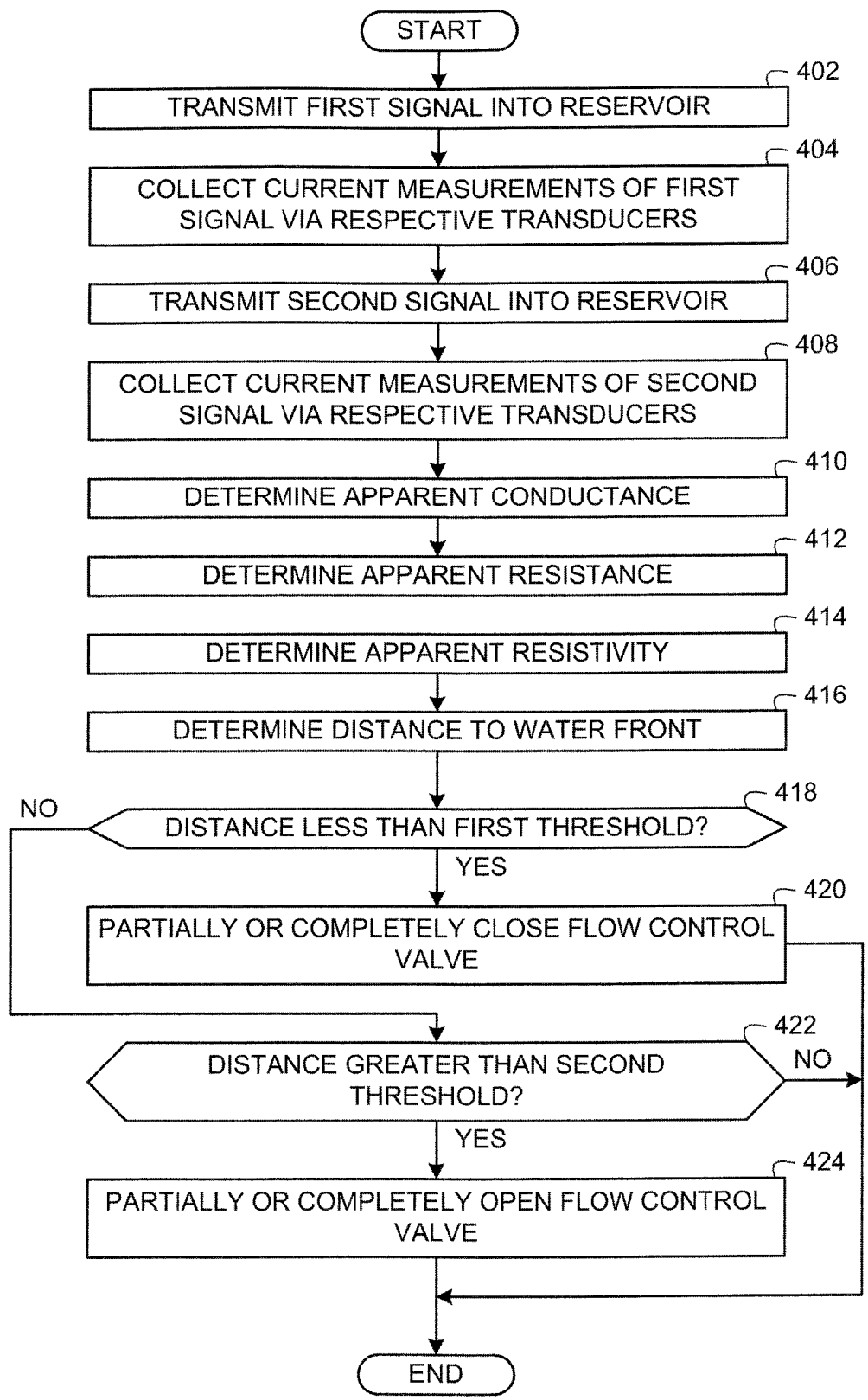
FIG. 4 illustrates an example flow diagram representative of a process that may be used to monitor water fronts and control fluid extraction from a reservoir.

Flowcharts representative of example processes that may be implemented using the apparatus 200 are shown in FIGS. 3 and 4. FIG. 3 illustrates an example flow diagram representative of a calibration process to determine apparent conductivity (e.g., the apparent conductivity M of Equation 1 above) as a function of water front distance (e.g., the distance between the water front 104 and the tube 12 of FIG. 1). FIG. 4 illustrates an example flow diagram representative of a process that may be used to monitor water fronts (e.g., the water front 104 of FIG. 1) and control fluid extraction from the reservoir 100 of FIG. 1. In these examples, the processes comprise one or more programs for execution by a processor such as the processor 212. The program(s) may be embodied in software or machine readable instructions stored on a tangible computer readable medium such as a CD-ROM, a floppy disk, a hard drive, a digital versatile disk (DVD), a Blu-ray disk, or a memory (e.g., the memory 214) associated with the processor 212, but the entire program(s) and/or parts thereof could alternatively be executed by a device other than the processor 212 and/or embodied in firmware or dedicated hardware. Further, although the example program(s) are described with reference to the flowcharts illustrated in FIGS. 3 and 4, other methods of implementing the example apparatus 200 may alternatively be used. For example, the order of execution of the blocks may be changed, and/or some of the blocks described may be changed, eliminated, or combined.

Figure 5:
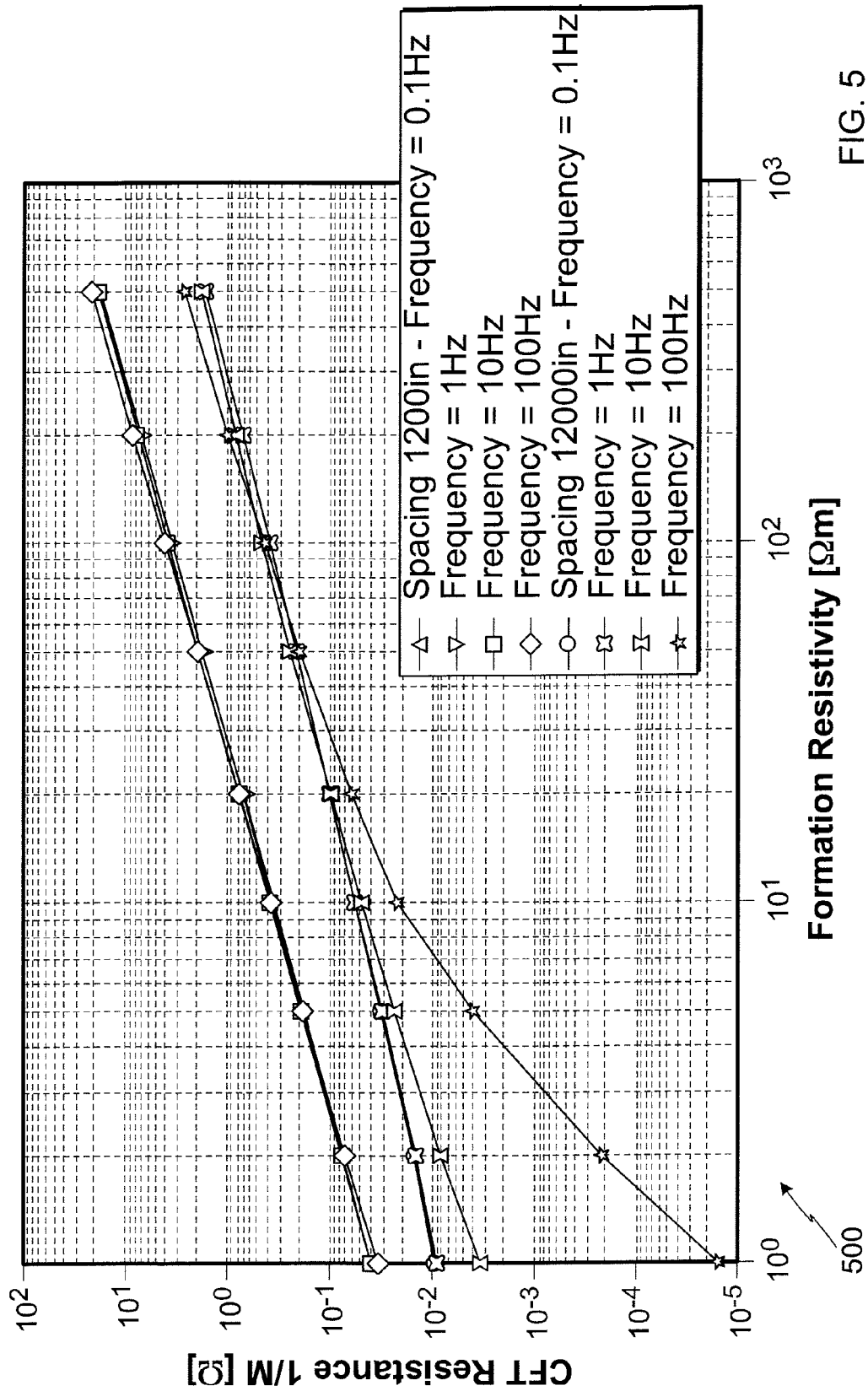
FIG. 5 illustrates a graph of example system responses of cylindrical focused technique (CFT) resistances for different homogeneous formation resistivities, different spacings between transducers, and different frequencies.
Figure 6:
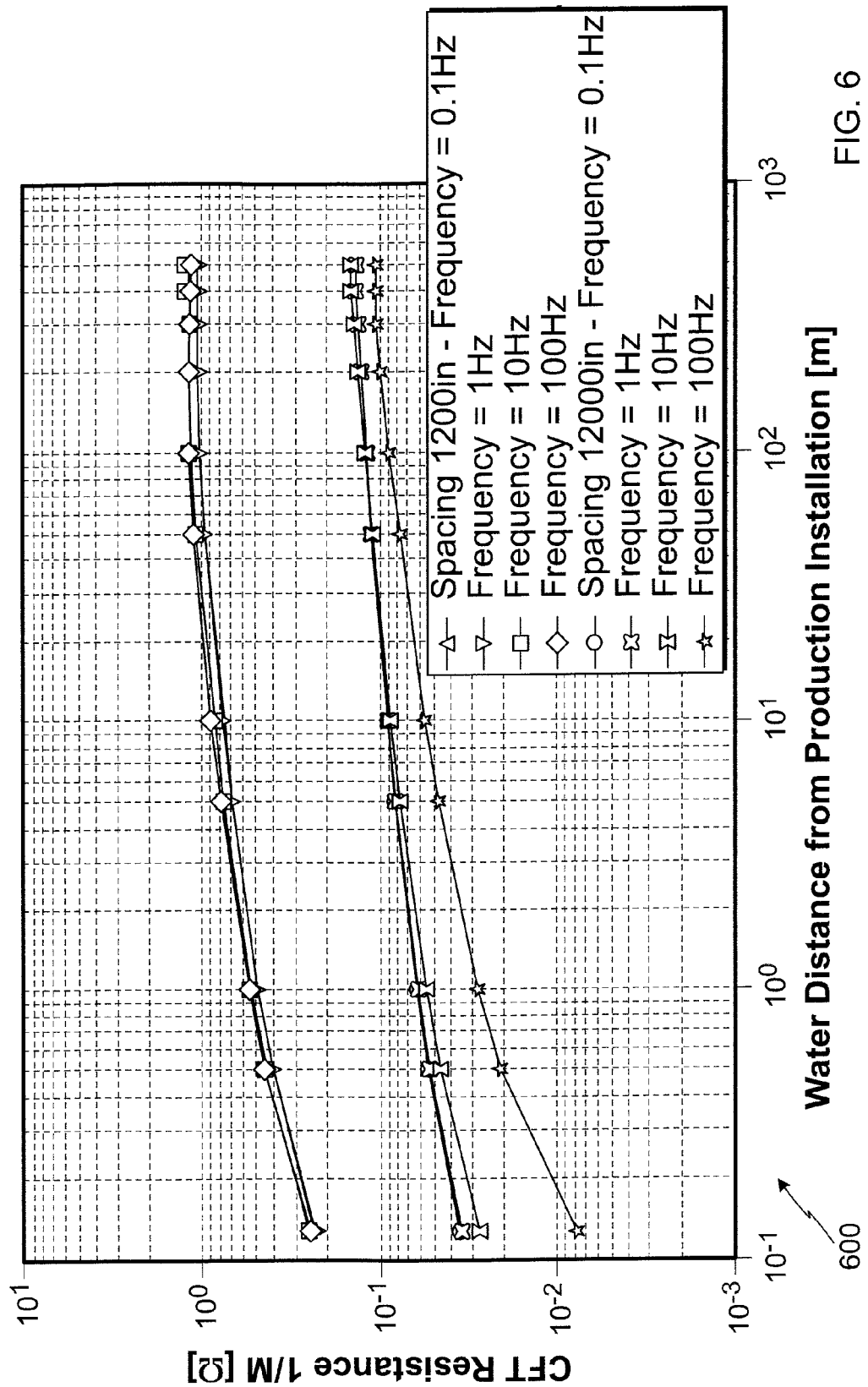
FIG. 6 illustrates a graph of example system responses of CFT resistances for different distances between a production installation and a water front, different spacings between transducers, and different frequencies.
Figure 7:
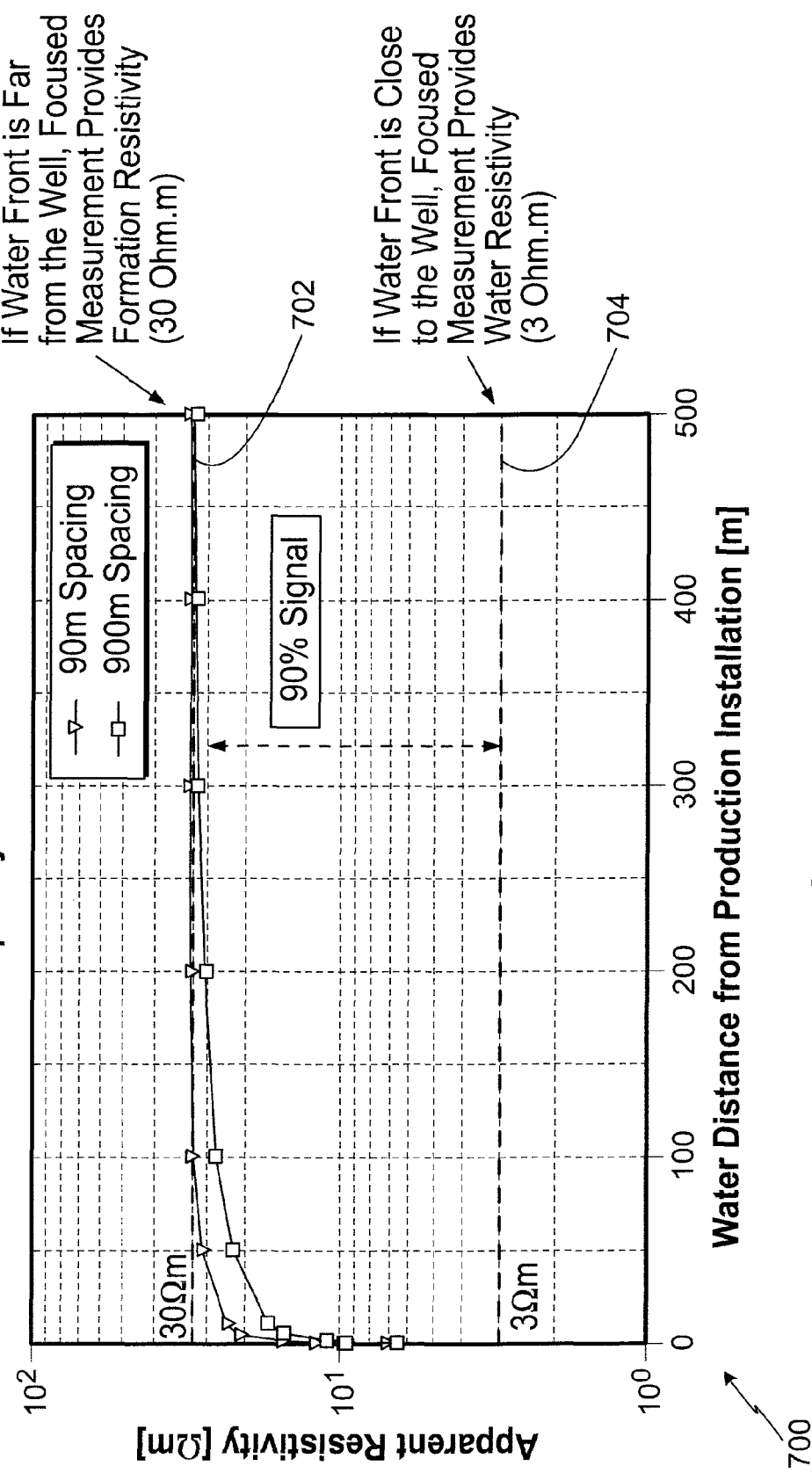
FIG. 7 illustrates a graph of example apparent resistivities as a function of water front distance from a production installation of FIGS. 1 and 2.

The method of FIG. 3 is described as being performed by the processor 212 of FIG. 2. However, the method of FIG. 3 may be performed by any processor and need not be performed at the logging and control system 108 of FIG. 1. In some examples, the method of FIG. 3 is performed at a laboratory based on measurements collected at one or more wellsites known to have varying distances to water fronts. In this manner, the method of FIG. 3 is used to determine typical or standard system responses for homogeneous formation resistivity, typical or standard system responses for different distances between production installations and water fronts, and apparent resistivities versus water front distances. This data can be used to form look-up tables or graphs (e.g., as shown in FIGS. 5-7) that can subsequently be used by the logging and control system 108 to determine distances between a production installation (e.g., the production installation 12 of FIG. 1) and water fronts (e.g., the water front 104 of FIG. 1).

Turning in detail to FIG. 3, initially, the processor 212 determines one or more system responses for homogeneous formation resistivity (block 302). In the illustrated example, the system response(s) determined at block 302 are computed using the cylindrical focused technique (CFT). The system response provides resistances which are shown in a graph 500 of FIG. 5. In the illustrated example, the processor 212 determines CFT resistance as an inverse of CFT conductance M (i.e., 1/M), where the CFT conductance M is determined using Equation 1 above based on two-dimensional (2D) cylindrical symmetrical modeling results. The system responses of the graph 500 are the calculated CFT resistances 1/M (Ohm ($\Omega$))) relative to formation resistivities (Ohm·m ($\Omega$m)) for homogeneous formations ranging from 1 Ohm-meter (Ohm·m ($\Omega$m)) to 500 Ohm·m. The graph 500 is based on using four frequencies of 0.1 Hz, 1 Hz, 10 Hz, and 100 Hz for transducer signal transmissions. In addition, the CFT resistances 1/M of the graph 500 are computed for two different transducer-boundary spacings 210 (e.g., 1200 inches and 12000 inches) for the transducer-boundary spacing 210 of FIG. 2.

The processor 212 determines the formation resistivities of FIG. 5 as apparent resistivities $R_a$ based on Ohm's law using the laterolog equation shown in Equation 2 below.

$$R_a = K \cdot \frac{V}{I} \qquad \text{Equation 2}$$

In Equation 2 above, a current I measured by a given one of the transducers 202a-d (FIG. 2) is directly proportional to the formation conductivity (e.g., the CFT conductance M). As such, in Equation 2, V is the voltage applied across one of the transducers 202a-d when it transmits a signal, and I is the current measured at another one of the transducers 202a-d when the signal is transmitted based on the voltage V. For example, the voltage V of Equation 2 can be set equal to the voltage $V_4$ (of Equation 1 above) across the transducer 202d, when the transducer 202d transmits, and the current I can be set equal to the measured current $M_{14}$ (of Equation 1 above) across the transducer 202a, when the transducer 202d transmits based on the voltage $V_4$. Thus, each CFT resistance value 1/M (Ohm ($\Omega$))) of Graph 500 maps to a corresponding formation resistivity ($\Omega$m) based on having the same voltages (V=$V_4$) and the same currents (I=$M_{14}$).

In Equation 2 above, a proportionality coefficient K is a geometric factor having a value based on the tool geometry of the fluid extraction tool 14 (FIG. 1) and the transducer-boundary spacing 210 (FIG. 2). The proportionality coefficient K is named "K-factor" and has the dimension of a length. It is used as a normalization constant and can be set to suitable values based on the length of the transducer-boundary spacing 210. In the illustrated example, the proportionality coefficient K is derivable from the graph 500 of FIG. 5. For example, for a short 1200-inch transducer-boundary spacing 210, the K-factor is evaluated at 25 for all types of formations (from 1 Ohm·m to 500 Ohm·m). For a 12000-inch transducer-boundary spacing 210, a skin effect appears in low-resistivity formations, and the K-factor is different in such zones. In such instances, a mapping from apparent conductance M to apparent resistivity ($\Omega$m) can be used and can compensate for the skin effect.

The processor 212 also determines one or more system responses for different distances between the production installation 12 and the water front 104 (block 304). In the illustrated example, the system response(s) determined at block 304 are based on CFT resistances 1/M (Ohm ($\Omega$)) and are shown in a graph 600 of FIG. 6. The processor 212 determines the CFT resistances 1/M (Ohm ($\Omega$)) based on the inverse of CFT conductance M determined using Equation 1 above based on two-dimensional (2D) cylindrical symmetrical modeling results. For different distances (m) between a production installation (e.g., the production installation 12 of FIG. 1) and a fluid distribution (e.g., the water front 104), the processor 212 determines a corresponding CFT resistance 1/M (Ohm ($\Omega$)) for four frequencies of 0.1 Hz, 1 Hz, 10 Hz, and 100 Hz, and for the two different lengths of 1200 inches and 12000 inches for the transducer-boundary spacing 210 of FIG. 2. In the illustrated example of FIG. 6, the apparent conductance M is computed in a homogeneous formation (30 Ohm·m) with a water front (3 Ohm·m) drawing closer to the production installation 12, starting at 19680 inches (500 m) away from the tube 12 to a 5-inch (0.12-inch) distance from the tube 12.

The processor 212 determines apparent resistivities ($\Omega$m) versus water front distances (m) (block 306). FIG. 7 shows a graph 700 of apparent resistivities ($\Omega$m) versus water front distance (m) generated by the processor 212 based on the system responses of blocks 302 and 304. For ease of illustration, only results for the 10 Hz frequency are represented in FIG. 7. However, the processor 212 may determine results of apparent resistivities ($\Omega$m) versus water front distance (m) for the other frequencies represented in FIGS. 5 and 6. In the illustrated example of FIG. 7, the graph 700 shows that the apparent resistivity ($\Omega$m) decreases as the water front 104 gets closer to the production installation 12. When the water front 104 is far from the well 11 (FIG. 1), the transducers 202a-d (FIG. 2) do not detect the presence of water and the apparent resistivity ($\Omega$m) is equal to the formation resistivity (30 $\Omega$m) shown at reference numeral 702. On the other hand, as the water front 104 draws closer to the production installation 12, the processor 212 determines an apparent resistivity closer to 3 $\Omega$m shown at reference numeral 704, which is the resistivity of water. Between the two boundary values of formation resistivity (30 $\Omega$m) 702 and water resistivity (3 $\Omega$m) 704, the apparent resistivity ($\Omega$m) decreases as the water front 104 undergoes water coning 114 (FIG. 1) and draws closer to the production installation 12.

After the processor 212 determines the apparent resistivities ($\Omega$m) versus water front distances (m) at block 306, the method of FIG. 3 ends, and the processor 212 provides the data represented in graphs 500, 600, and/or 700 for use in production phases at wellsites to monitor movements of water fronts. The changes in apparent resistivity ($\Omega$m) enable determining distances between the production installation 12 and the water front 104 during a production phase by comparing apparent resistivities ($\Omega$m) determined during the production phase to the graph 700 of apparent resistivities ($\Omega$m) versus water front distance (m). An example manner of using the graph 700 and calculated apparent resistivities ($\Omega$m) during a production phase to monitor the water front 104 and water coning 114 is described below in connection with FIG. 4.

Turning now to FIG. 4, the illustrated flow diagram is representative of an example method that may be used to monitor distances between the water front 104 and the production installation 12 of FIG. 1, and to control fluid extraction rates from the reservoir 100 based on the distances. Initially, the transducer controller 206 (FIG. 2) causes the transducer 202a (FIG. 2) to transmit a first signal into the reservoir 100 (block 402), for example, based on a particular electrical current and voltage applied across the transducer 202a. In some examples, the processor 212 and/or the transducer controller 206 locate(s) information (e.g., measurements, valve status, fluid extraction status, or other information) in the first signal prior to transmission so that when the transducer 202a transmits the first signal it carries the information for reception by a receiver at a surface of the wellsite. In this manner, the transducers 202a-d, the processor 212, and/or the transducer controller 206 can be used to implement a telemetry system or a redundant telemetry system for sending information to the surface from the production installation 12.

The transducer controller 206 then collects current measurements of the first signal via respective transducers (block 404). For example, the transducer controller 206 causes the transducers 202b and 202c to receive looped back or return portions of the first signal transmitted at block 402. In this manner, the transducer controller 206 measures an electrical current value ($I_{2a}$) based on the receiving of the first signal at the transducer 202b, and an electrical current value ($I_{3a}$) based on the receiving of the first signal at the transducer 202c.

The transducer controller 206 causes the transducer 202d (FIG. 2) to transmit a second signal into the reservoir 100 (block 406), for example, based on a particular electrical current and voltage applied across the transducer 202d. The transducer controller 206 then collects current measurements of the second signal via respective transducers (block 408). For example, the transducer controller 206 causes the transducers 202c and 202b to receive looped back or return portions of the second signal transmitted at block 406. In this manner, the transducer controller 206 measures an electrical current value ($I_{3d}$) based on the receiving of the second signal at the transducer 202c, and an electrical current value ($I_{2d}$) based on the receiving of the second signal at the transducer 202b.

The processor 212 (FIG. 2) determines an apparent conductance M (block 410) of the reservoir 100 using, for example, the measured electrical current values of blocks 404 and 408 and Equation 1 above. The processor 212 determines an apparent resistance 1/M (Ohm ($\Omega$)) (block 412) of the reservoir 100 by, for example, computing the inverse of the apparent conductance M determined at block 410. The processor 212 determines an apparent resistivity (Ωm) of the reservoir 100 (block 414). For example, the processor 212 may look up an apparent resistivity (Ωm) in the graph 500 that corresponds to the apparent resistance 1/M (Ohm (Ω)) determined at block 412. The processor 212 determines a distance between the production installation 12 (FIG. 1) and the water front 104 (FIG. 1) (block 416). For example, the processor 212 may look up the water front distance in the graph 700 that corresponds to the apparent resistivity (Ωm) determined at block 414.

In the illustrated example, the water front 104 moves closer to the production installation 14 as the water coning 114 (FIG. 1) forms while the fluid extraction tool 14 extracts fluid from the reservoir 100 during a production phase. By monitoring the distance from the production installation 12 to the water front 104 (and, thus, the presence of the water coning 114) using the operations of blocks 402, 404, 406, 408, 410, 412, 414, and 416, the apparatus 200 (FIG. 2) can control the fluid extraction rate of the fluid extraction tool 14 (FIGS. 1 and 2) to reduce or prevent water extraction from the water front 104, thereby increasing oil production.

To control the fluid extraction rate, the processor 212 determines whether the distance to the water front 104 is less than a first threshold (block 418). In the illustrated example, a first threshold is selected as a suitable distance defining how close the water front 104 can cone toward the production installation 12 without the fluid extraction tool 14 extracting water or extracting only an acceptably low amount of water. If the distance to the water front 104 is less than the first threshold (block 418), the valve controller 208 (FIG. 2) partially or completely closes one or more of the flow control valves 204a-d of FIG. 2 (block 420) to, for example, decrease or stop the fluid extraction rate of the fluid extraction tool 14. In some examples, the apparatus 200 decreases the fluid extraction rate, without ceasing it, if the movement of the water front 104 toward the production installation 12 can be slowed, stopped, or reversed by maintaining a slower fluid extraction rate. In some examples, the apparatus 200 may employ multiple thresholds to define when the flow control valves 204a-d are to be partially closed at corresponding increments to progressively slow the fluid extraction rate without completely stopping until it is absolutely necessary (e.g., the water front 104 moves too close to the production installation 12).

If the distance to the water front 104 is not less than the first threshold (block 418), the processor 212 determines whether the distance to the water front 104 is greater than a second threshold (block 422). If the distance to the water front 104 is greater than the second threshold (block 422), the valve controller 208 partially or completely opens one or more of the flow control valves 204a-d of FIG. 2 (block 424) to, for example, increase the fluid extraction rate of the fluid extraction tool 14. In the illustrated example, the second threshold is larger than the first threshold of block 418 and is selected as a suitable distance defining how far from the production installation 12 the water front 104 should be to increase a fluid extraction rate by opening or further opening a flow control valve 204a-d. In the illustrated example, the distance to the water front 104 being greater than the second threshold means that the fluid extraction rate can be relatively high with little or no risk of the fluid extraction tool 14 extracting water from the water front 104. After partially or completely opening one or more of the flow control valves 204a-d (block 424), or partially or completely closing one or more of the flow control valves 204a-d (block 420), or if the distance to the water front 104 is not greater than the second threshold, the example process of FIG. 4 ends.

Accordingly, examples disclosed herein may be used to improve production quality by monitoring water front arrivals near production wells. Disclosed examples may be used to detect water front movements early and implement proactive mitigation techniques to prevent or substantially decrease instances of water breakthroughs. As such, examples disclosed herein may be used to implement, monitor, and/or adjust optimization strategies for production rate and recovery.

Although disclosed examples are described herein in connection with a production phase, the disclosed water front monitoring techniques may also be used during drilling phases to optimize drilling paths. In such examples, the transducers 202a-d are located close to a drill bit (e.g., at a bottom hole assembly) to monitor for approaching water fronts in real time while drilling, and changing drilling trajectories based on measurements of surrounding formation resistivities.

Examples disclosed herein may also be used in connection with more complex geometries, with anisotropy to identify changes over time (e.g., production monitoring, time-lapse reservoir), and/or with scenario matching in measuring while drilling (MWD) (e.g., well placement) processes. Examples disclosed herein may also be used to perform inter-lateral tomography (e.g., the transducers 202a-d are located at another lateral separate from the lateral of interest), inter-well tomography (e.g., the transducers 202a-d are located at another well separate from the well of interest), surface-to-well tomography (e.g., the transducers 202a-d are located at the surface), or sea-floor-to-well tomography (e.g., the transducers 202a-d are located at a subsea surface such as the sea bottom).

Although certain methods, apparatus, and articles of manufacture have been described herein, the scope of coverage of this disclosure is not limited thereto. To the contrary, this disclosure covers all methods, apparatus, and articles of manufacture fairly falling within the scope of the claims either literally or under the doctrine of equivalents.

What is claimed is:

1. A method, comprising:
   transmitting a first signal by a first transducer based on a first electrical current value;
   receiving the first signal transmitted into a reservoir from a production installation in a formation at a wellsite at a second transducer and a third transducer;
   measuring the first signal at the second transducer to determine a second electrical current value and at the third transducer to determine a third electrical current value;
   determining an apparent resistance of the reservoir based on the first signal by multiplying a difference between the second and third electrical current values by a mean of fourth and fifth electrical current values, the fourth electrical current value measured at the second transducer and the fifth electrical current value measured at the third transducer when a fourth transducer transmits a second signal into the reservoir; and
   determining a distance between a fluid extraction tool and a fluid distribution based on the apparent resistance.

2. A method as defined in claim 1, wherein determining the distance between the fluid extraction tool and the fluid distribution comprises monitoring water coning of a water front into the reservoir.

3. A method as defined in claim 1, wherein the apparent resistance is indicative of a relatively larger distance between the fluid extraction tool and the fluid distribution when a corresponding apparent resistivity of the reservoir is closer to a formation resistivity than a water resistivity.

4. A method as defined in claim 1, further comprising:
opening or closing one or more flow control valves of the fluid extraction tool, based on the distance between the fluid extraction tool and the fluid distribution, to change a fluid extraction rate.

5. A method as defined in claim 1, wherein the apparent resistance is a cylindrical focused technique resistance, further comprising:
setting a spacing between a first transducer and a second transducer along the fluid extraction tool to control a depth of investigation in the reservoir, the depth of investigation corresponding to how far from the fluid extraction tool a water front is detectable, and
wherein increasing the spacing between the first and second transducers increases the depth of investigation.

6. A method as defined in claim 1, further comprising:
locating information in the first signal for reception by a receiver located at least at one of a surface of the wellsite or a subsea surface, and transmitting the first signal into the reservoir; and
receiving at the production installation second information via a second signal from the at least at one of the surface of the wellsite or the subsea surface.

7. An apparatus, comprising:
a transducer controller to measure a first signal transmitted into a reservoir from a production installation in a formation at a wellsite, wherein the transducer controller:
causes a first transducer to transmit the first signal based on a first electrical current value, and
measures the first signal at a second transducer to determine a second electrical current value and at a third transducer to determine a third electrical current value; and
a processor to:
determine an apparent resistance of the reservoir based on the first signal, wherein the processor determines the apparent resistance by multiplying a difference between the second and third electrical current values by a mean of fourth and fifth electrical current values, the fourth electrical current value measured at the second transducer and the fifth electrical current value measured at the third transducer when a fourth transducer transmits a second signal into the reservoir; and
determine a distance between a fluid extraction tool and a fluid distribution based on the apparent resistance.

8. An apparatus as defined in claim 7:
wherein the processor is further to locate information in the first signal for reception by a receiver located at least at one of a surface of the wellsite or a subsea surface, and the transducer controller is to cause a transducer to transmit the first signal into the reservoir;
wherein the processor is further to determine the distance between the fluid extraction tool and the fluid distribution comprises monitoring water coning of the fluid distribution into the reservoir;
wherein the transducer controller or the processor are to locate information in the first signal for reception by a receiver at a surface of the wellsite; and wherein the transducer controller is to receive second signals containing second information sent from transmitters located at the at least at one of the surface of the wellsite or at the subsea surface.

9. An apparatus as defined in claim 7, wherein the apparent resistance is indicative of a relatively larger distance between the fluid extraction tool and the fluid distribution when a corresponding apparent resistivity is closer to a formation resistivity than a water resistivity.

10. An apparatus as defined in claim 7, further comprising:
a valve controller to open or close one or more flow control valves of the fluid extraction tool, based on the distance between the fluid extraction tool and the fluid distribution, to change a fluid extraction rate.

11. An apparatus as defined in claim 7, wherein the apparent resistance is a cylindrical focused technique resistance, wherein the transducer controller is to control first and second transducers in the fluid extraction tool to determine the distance between the fluid extraction tool and the fluid distribution, a spacing between the first and second transducers along the fluid extraction tool being set to control a depth of investigation in the reservoir, the depth of investigation corresponding to how far from the fluid extraction tool a water front is detectable.

12. A system, comprising:
a production installation to be located in a formation at a wellsite;
a plurality of transducers located in the production installation and to be located along a horizontal portion of the formation to measure signals transmitted into a reservoir; and
a processor to determine a distance between a fluid extraction tool and a fluid distribution based on the measured signals, wherein the processor is to determine the distance between the fluid extraction tool and the fluid distribution based on an apparent conductance, wherein the apparent conductance is determined by:
determining a difference between a first electrical current value measured by a first transducer and a second electrical current value measured by a second transducer based on a first signal transmitted by a third transducer into the reservoir;
determining a mean of a third electrical current value measured at the first transducer and fourth electrical current value measured by the second transducer based on a second signal transmitted by a fourth transducer into the reservoir; and
multiplying the difference by the mean.

13. A system as defined in claim 12 further comprising:
a valve controller to open or close one or more flow control valves in the fluid extraction tool based on the distance between the fluid extraction tool and the fluid distribution.

14. A system as defined in claim 12, wherein the transducers are to transmit signals in the reservoir containing information for reception by a receiver located at least at one of a surface of the wellsite or at a subsea surface and wherein the transducers are to receive second signals containing second information sent from transmitters located at the at least at one of the surface of the wellsite or at the subsea surface.

* * * * *